Sept. 17, 1929.  J. W. BRUSSEL  1,728,198
HOB
Filed June 30, 1927   2 Sheets-Sheet 1

INVENTOR:
John W. Brussel
HIS ATTORNEYS

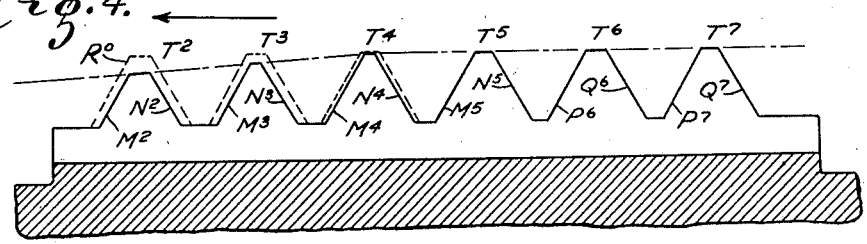
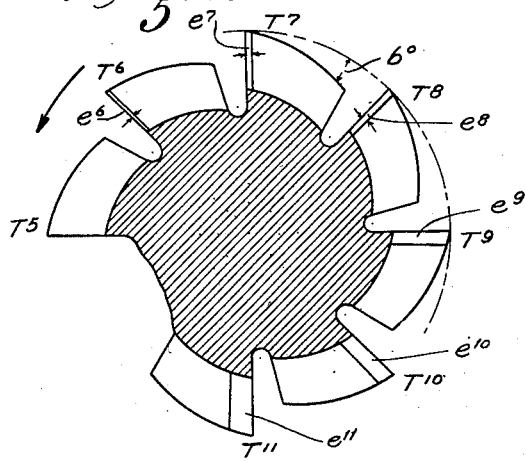
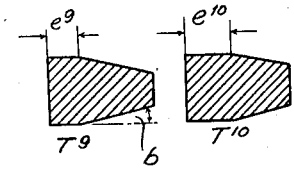
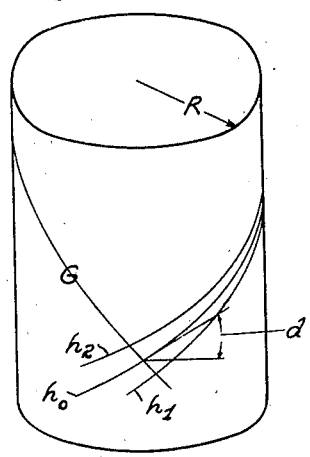
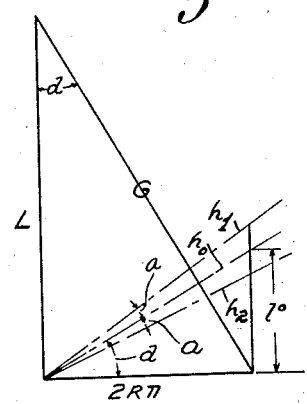

Patented Sept. 17, 1929

1,728,198

UNITED STATES PATENT OFFICE

JOHN W. BRUSSEL, OF DETROIT, MICHIGAN, ASSIGNOR TO THE TIMKEN-DETROIT AXLE COMPANY, OF DETROIT, MICHIGAN, A CORPORATION OF OHIO

HOB

Application filed June 30, 1927. Serial No. 202,486.

My invention relates to hobs or helical cutters, particularly hobs of the type that are adapted to generate worm wheels by the tangential feed method. Its principal objects are to devise a hob that will produce gears of greater accuracy than hobs of the type now in use; also to devise a hob that will not only cut the gear but will also burnish the same in a single operation; also to devise a hob that will withstand a greater number of sharpenings than has heretofore been practicable without changing its diameter or tooth form or helical angle; also to devise a hob that will produce more gears for each sharpening thereof than has heretofore been practicable. The invention consists principally in forming the rear teeth of constant width and with cylindrical lands that increase in width successively towards the rear of the hob. It also consists in the construction and arrangements hereinafter described and claimed.

In the accompanying drawing wherein like reference letters and numerals refer to like parts wherever they occur, Fig. 1 shows the front elevation of my improved hob in which the roughing, finishing, and burnishing portions are indicated by the letters A, B, and C, respectively;

Fig. 4 is a diagrammatic view of a plane section of the new hob taken through the hob axis;

Fig. 5 is a section perpendicular to the axis;

Fig. 6 is a detail view of two consecutive hob teeth showing progressively increasing cylindrical lands: and Figs. 7 and 8 are geometrical diagrams, explanatory of the calculation of the new hob helixes.

Figure 1:
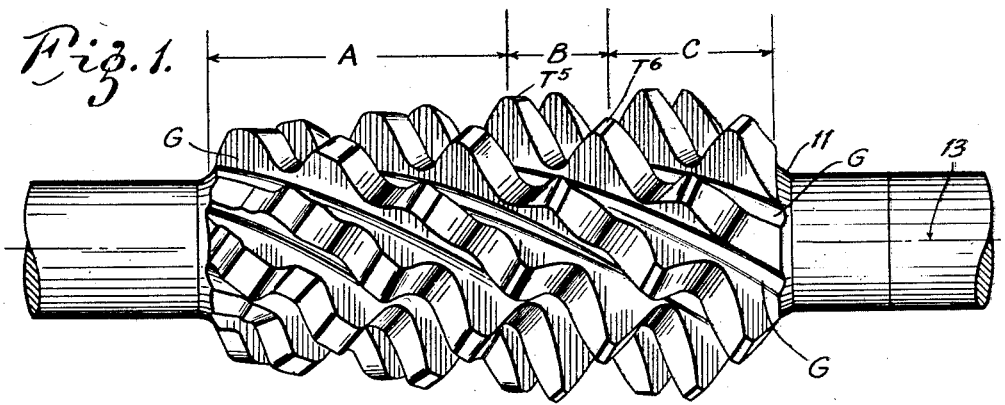

The principle of worm gear hobbing by means of the tangential feed is well known and consists in constructing a worm hob that has the same pitch diameter, helix angle, and form of tooth as the worm which it represents, in providing the entering end of said hob with a tapered portion followed by a cylindrical portion, in setting said hob in a hobbing machine at the predetermined center distance from the blank to be cut, in rotating the two members in a fixed relation, and in imparting to the hob a translatory or tangential feed in the direction of its axis. By this means all the teeth in the blank are finished on both their sides and in a single cutting operation. Heretofore, the teeth of a hob have been formed by intersecting the hob threads with a plurality of helical flutes or gashes, said flutes being of an opposite hand to that of the hob threads and so selected that, first, they intersect the hob threads at preferably right angles and, second, produce radial cutting faces in hob teeth, i. e., faces perpendicular to the hob axis, the remaining truncated portions of the hob threads being relieved in a relieving lathe so that the cutting faces will stand out prominently relative to the rear portions of the teeth and thereby will possess a cutting clearance. In consequence of such relieving or "backing off" of the teeth to produce a cutting clearance, such hobs were of comparatively short life, because the sharpening thereof would reduce the diameter of the hob and would change the form of the teeth and the helical angle, all of which tended to produce inaccurate gears.

I have discovered that when the "tangential feed" principle of worm gear generating is employed, it is not necessary to provide all cutting teeth with the same degree of relief or cutting clearance, but that said clearance may be distributed from the front or entering end of the hob toward its rear end in an ever diminishing ratio without affecting the free cutting qualities of said hob. Accordingly, in my preferred construction, I divide the body of the preferably integral hob into three portions, viz., a roughing portion A, a finish-cutting portion B, and a burnishing portion C, the cutting clearance of each successive tooth of the roughing and finish-cutting portions being less than that of the preceding tooth, and the teeth of the burnishing portion having practically no cutting clearance. The entering or roughing portion A is tapered and its teeth do the initial and rough cutting; the middle portion B is cylindrical and its teeth do the finish-cutting; and the final portion C is cylindrical and its teeth burnish the work cut by the preceding teeth.

My new hob is laid out as follows: First a straight line $h_0$ is laid out representing the pitch helix of the hob teeth, which line has a helical angle $d$ relative to the plane 12 which is perpendicular to the axis 13 of the hob. A straight line is then laid off at right angles to the helix line $h_0$ of a length equal to the width of the first tooth of the finishing section of the hob, the ends $M^5$ and $N^5$ of this line being equi-distant from the helix line $h_0$. Through the points $M^5$ and $N^5$, respectively, are drawn two lines $h'$ and $h''$ parallel to the pitch helix line $h_0$ and representing the primary helixes of the new hob. Also through said points $M^5$ and $N^5$ are drawn straight lines $h_1$ and $h_2$ that converge toward the helix line $h_0$ and make an angle $a$ therewith. These lines $h_1$ and $h_2$ represent the secondary helixes and have respectively the helix angle $d+a$ and $d-a$. The teeth are then laid off at equi-distant intervals along the helix line $h_0$ with their cutting faces represented by lines at right angles thereto and extending from one secondary helix line $h_1$ to the other secondary helix line $h_2$. By this arrangement, the foremost tooth is the narrowest, and the width of each successive tooth increases up to and including the first finishing tooth $M^5$ $N^5$ whose ends lie at the points of intersection of the primary and secondary helixes. At this point, of course, the distance between the secondary helixes is the same as the distance between the primary helixes.

The width of all of the finishing and burnishing teeth is the same, namely the distance between the primary helix lines $h'$ and $h''$. However, although the faces of the finishing or burnishing teeth are of equal width, they are of different form, as will appear from Fig. 2 of the drawing. In laying off the finishing or burnishing teeth their face lines are extended to intersect with the lines $h_1$ $h_2$ representing the secondary helixes and, from these points of intersection, lines parallel with the lines representing the relieved sides of the roughing teeth are drawn, which side lines intersect the lines $h'$ and $h''$ representing the primary helixes. These points of intersection with the primary helix lines are further and further from the face line for each successive finishing and burnishing tooth. In this layout, all of the roughing teeth and the first finishing tooth are represented by trapeziums of equal height but different width, whereas all teeth subsequent to the first finishing tooth can be considered as continuing the series of trapeziums but with their face corners cut away along the primary helix lines $h'$ and $h''$.

In practice the hob is made as follows: The hob teeth are first milled parallel to the helix $h_0$, leaving sufficient stock for the subsequent operations. Then the tops of the teeth are relieved or "backed-off" along the cone $C^1$ and cylinder $C^2$, Fig. 3, with the desired amount of top clearance $b^0$. Then the relieving machine is geared up to a lead $l^2$ of helix shorter than the lead $l^0$ of the pitch helix $h_0$, Fig. 2, and the cutting edges "backed-off" along the helix $h_2$ passing through the points $N^1$, $N^2$, $N^3$, etc. with the clearance $b$. Then the relieving machine is geared up again to a lead $l^1$, longer than the before mentioned $l^0$, thus producing the helix $h_1$, passing through the points $M^1$, $M^2$, $M^3$ etc. and the teeth $T^1$, $T^2$, etc. are relieved with the same degree of clearance as formerly. In this manner, a series of tapered cutting teeth are obtained having their cutting widths uniformly increasing from the minimum width M, N, of the first entering tooth $T^1$, progressively toward the rear end of the hob.

Figure 2:
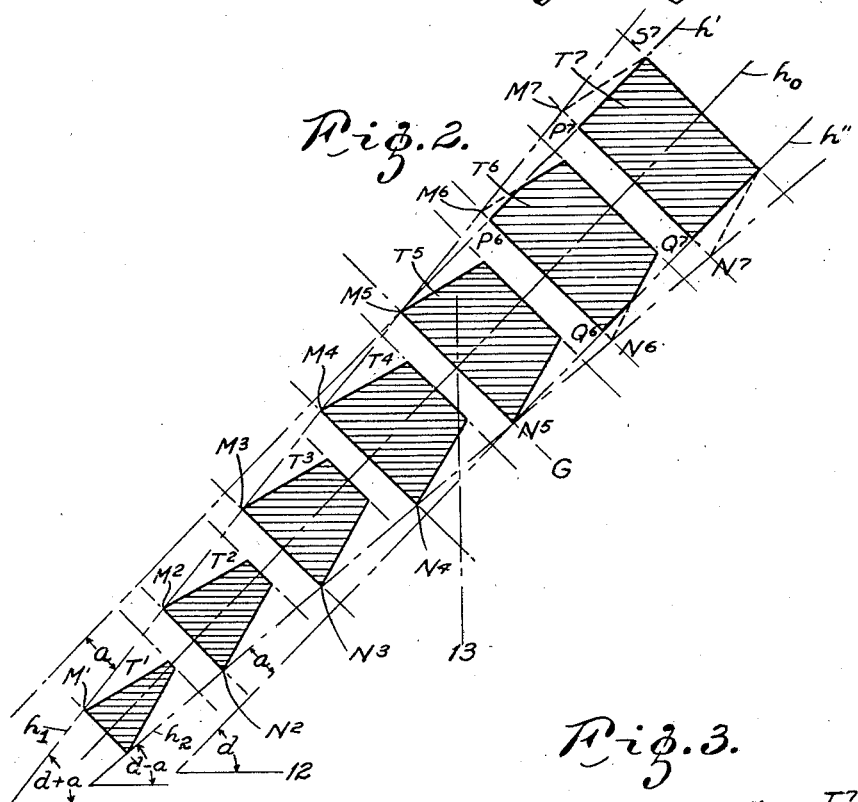
Fig. 2 is a diagrammatic view showing the development of the new hob teeth in the pitch plane.

After the hob thus partially machined has been hardened, the formation of the improved cutting teeth is completed by trimming said teeth cylindrically (without giving the cutting teeth any further relief) preferably by means of a grinder along the helixes $h'$ and $h''$ Fig. 2, the lead of helix being now $l^0$. The effect of this operation will be that the roughing teeth $M^1$ to $M^4$ inclusive will remain untouched, while the tooth $T^5$ will just barely be touched at the points $M^5$, $N^5$, the latter distance corresponding exactly to the predetermined width of tooth necessary to generate correct worm wheels with the required amount of "back lash." The next cutting tooth $T^6$ will be trimmed off to the width $P^6$ $Q^6$, and the tooth $T^7$ to a width $P^7$ $Q^7$, both of said widths being exactly equal to the finishing width $M^5$ $N^5$ of the first finishing tooth $T^5$. It is seen that in this manner a series of similar triangles $M^6$, $P^6$, $S^6$, $M^7$, $P^7$, $S^7$ are trimmed off from the consecutive teeth $T^6$, $T^7$, etc., said triangles being all geometrically similar, but of an ever increasing area. This, in effect, produces upon the front faces of the burnishing teeth a series of cylindrical "lands" $P^6$, $S^6 = e^6$, $P^7$, $S^7 = e^7$, said lands $e^6$, $e^7$, etc. being of an ever increasing width.

Figure 3:
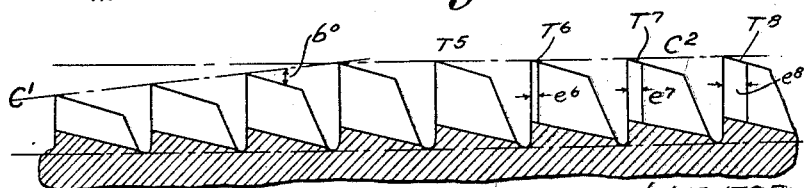
Fig. 3 is a diagrammatic view showing the development of a hob thread shown in Fig. 2 in elevation.

The formation of a series of ever broadening cylindrical lands $e^6$, $e^7$, etc. on the front faces of the burnishing teeth $T^6$, $T^7$, etc. may also be studied in Figs. 3, 5 and 6, which diagrams will be readily understood from the preceding explanation. In Fig. 4, the conditions governing the increasing widths of the improved hob teeth $T^2$ to $T^7$ may be observed in comparison with the standard rack $R^0$, the latter being shown in dotted lines superposed upon the improved teeth. It will be seen that after the first finishing tooth $T^5$ has been reached the widths of subsequent cutting teeth $T^6$ and $T^7$ will no longer increase, but will remain constant.

The practical importance of my invention will best be understood by examining Fig. 5. The first finishing tooth $T^5$ will cut the worm gear teeth to their full size, theoretically. In practice, however, I observed that, due to the vibration of the hobbing machine and other causes, some little stock may remain uncut by the tooth $T^5$, which stock will be removed by the subsequent teeth $T^6$, $T^7$, etc. As said teeth have a line bearing upon the finished gear teeth, it follows that first they will lessen the vibration of the hob because they will provide a series of additional points of support to the hob and second, said teeth will burnish to gear tooth surfaces and produce a smoother finish. Thus, a hob of this kind will remain sharp for a longer period of cutting time because of the lessened vibration.

When the hob teeth become dull and are resharpened, Fig. 5, a portion from the faces of each tooth $T^5$, $T^6$, etc. is ground off. Suppose that the amount thus taken off is exactly equal to the width of the land $e^6$ of the tooth $T^6$. It is seen then that the tooth $T^5$ will become the last roughing tooth instead of being the first finishing tooth as formerly, and $T^6$ will now become the first finishing tooth. The cylindrical lands $e^7$, $e^8$, $e^9$, etc. will now all be narrower than formerly because the width $e^6$ has been subtracted from each. Thus, the only difference in the cutting action will be that the number of roughing teeth has been increased by one, and the number of finishing teeth has been decreased by one. If there be a sufficiently large number of finishing teeth in this hob, it is evident that the hob may be resharpened a great many times before it loses its size or helical angle, thus materially reducing the tool cost.

The calculation of the secondary base helixes $h_1$ and $h_2$ will now be explained. As seen from Figs. 7 and 8, the lead of the primary helix $h_0$ is equal to $l^0$ and the helix angle of the same is equal to $d$. Let the pitch radius of the hob be denoted with R, then $$l^0 = 2 R\pi \tan d \quad (1)$$

If we now denote the increment or the decrement in the helix angles of the secondary helixes $h_1$ and $h_2$ with $a$, their helix angles will be $a+d$ and $a-d$ respectively.

Let the corresponding leads of helixes be $l^1$ and $l^2$ and we have $$l^1 = 2 R\pi \tan (a+d) \quad (2)$$
$$l^2 = 2 R\pi \tan (a-d) \quad (3)$$

Thus the leads of the secondary helixes may be determined because all the quantities on the right side of the equations (2) and (3) are known. To determine the lead L of the flutes G, Fig. 8, we write $$L = \frac{2R\pi}{\tan d} = \frac{l^0}{\tan 2d} \quad (4)$$

which gives the lead of flutes.

It is obvious from the foregoing description that my hob may be repeatedly sharpened without changing the diameter of the finishing portion thereof and without changing the form of the teeth that do the finish-cutting and the burnishing and without changing the helical angle. Consequently the working life of my hob is very much greater than that of other hobs heretofore used and throughout its life, my hob produces gears of the greatest accuracy, whereas present day hobs become more and more inaccurate with every sharpening. Another great advantage of my hob is that after the cutting is done, the rearmost teeth function to burnish the gears and to burnish the work in the same way in which a worm gear is burnished by the worm thread with which it is mated.

The method of manufacturing worm hobs hereinbefore described is set forth and claimed in my copending application Serial No. 301,476 filed August 23, 1928 as a division of the present application.

What I claim is:

1. A gear generating hob comprising a cylindrical body and a series of cutting teeth helically aligned thereon, the series consisting of an entering portion having consecutive teeth of an ever increasing width and a finishing portion having teeth of a constant width and an ever increasing width of cylindrical lands adjacent to the cutting edges.

2. A gear generating hob having a helically arranged series of finishing teeth formed by two diverging helixes, each tooth having a truncated relieved helicoidal body and an unrelieved portion of said body adjacent to the cutting edge.

3. A gear generating hob having a helically arranged series of finishing teeth, each tooth having a truncated relieved helicoidal body and an unrelieved portion of said body adjacent to the cutting edge, the widths of the unrelieved portions progressively increasing from the entering toward the rear end of the helical series.

4. A gear generating hob having a plurality of cutting teeth arranged in series along a helix with their cutting faces formed in the fronts thereof, a roughing portion of said series consisting of a plurality of relieved teeth having an ever increasing width and a finishing portion having teeth of constant width but of an ever increasing width of cylindrical lands adjacent to the cutting faces for the purpose of retaining the original form of tooth after repeated sharpenings upon said cutting faces.

5. A gear generating hob having a plurality of helically disposed cutting teeth with their cutting faces intersecting said helix at substantially right angles and equally spaced, a roughing portion comprising a plurality of teeth in said helical series formed by divergent helixes one of a greater and one of a lesser lead than the tooth helix, and a finishing portion formed of two parallel helixes, each equal in lead to the tooth helix.

6. A gear hob having a series of helically arranged cutting teeth, each tooth possessing a helical cutting face substantially at right angles thereto and having a radial relief such that in the first part of the series the relief begins immediately from the cutting faces and in the remaining part the relief begins at a distance from said cutting faces for the purpose of prolonging the useful life of said hob.

7. A gear hob having a series of helically arranged cutting teeth each tooth possessing a helical cutting face substantially at right angles thereto and having a radial relief such that in the first part of the series the relief begins immediately from the cutting faces and the widths of teeth are progressively increasing along the helix, and in the second part the relief begins at progressively increasing distances from said cutting faces.

8. A hob for generating worm gears according to the tangential feed method comprising a plurality of cutting teeth disposed along a helix and having cutting faces substantially perpendicular to such helix, said hob comprising a tapering portion at the front thereof in which the teeth are relieved along two divergent helixes and a cylindrical portion adjacent thereto in which the cutting faces are trimmed off along two parallel helixes but not relieved.

9. A worm hob having a cylindrical body and a plurality of helically arranged teeth thereon and consisting of a frusto-conical section having undersized and relieved teeth, a cylindrical section containing full sized and radially relieved teeth, and another cylindrical section containing full sized teeth that are unrelieved adjacent to their cutting edges.

Signed at Detroit, Michigan, this 27th day of June, 1927.

JOHN W. BRUSSEL.